United States Patent

Manning et al.

[11] Patent Number: 5,982,776
[45] Date of Patent: Nov. 9, 1999

[54] MULTIPOINT-TO-POINT ARBITRATION IN A NETWORK SWITCH

[75] Inventors: Thomas A. Manning, Northboro; Stephen A. Caldara, Sudbury; Stephen A. Hauser, Burlington, all of Mass.; Matthias L. Colsman, Cologne, Germany

[73] Assignees: Fujitsu Network Communications, Inc., Richardson, Tex.; Fujitsu Limited, Kawasaki, Japan

[21] Appl. No.: 08/827,931

[22] Filed: Apr. 29, 1997

Related U.S. Application Data

[63] Continuation of application No. 08/683,132, Jul. 18, 1996, abandoned.
[60] Provisional application No. 60/001,498, Jul. 19, 1995.

[51] Int. Cl.[6] .................................................. H04L 12/56
[52] U.S. Cl. ......................... 370/414; 370/235; 370/398; 370/462
[58] Field of Search ..................................... 370/229, 230, 370/231, 235, 386, 389, 395, 398, 412, 413, 414, 422, 428, 429, 461, 462, 465, 468, 399; 340/825.03, 826

[56] References Cited

U.S. PATENT DOCUMENTS

| | | |
|---|---|---|
| 3,804,991 | 4/1974 | Hammond et al. . |
| 3,974,343 | 8/1976 | Cheney et al. ...................... 179/18 ES |
| 4,069,399 | 1/1978 | Barrett et al. . |
| 4,603,382 | 7/1986 | Cole et al. ............................... 364/200 |
| 4,715,030 | 12/1987 | Koch et al. . |
| 4,727,537 | 2/1988 | Nichols . |
| 4,737,953 | 4/1988 | Koch et al. . |
| 4,797,881 | 1/1989 | Ben-Artzi . |
| 4,821,034 | 4/1989 | Anderson et al. ..................... 340/825.8 |
| 4,837,761 | 6/1989 | Isono et al. . |
| 4,849,968 | 7/1989 | Turner . |
| 4,870,641 | 9/1989 | Pattavina . |
| 4,872,159 | 10/1989 | Hemmady et al. . |
| 4,872,160 | 10/1989 | Hemmady et al. . |
| 4,878,216 | 10/1989 | Yunoki . |
| 4,893,302 | 1/1990 | Hemmady et al. . |

(List continued on next page.)

FOREIGN PATENT DOCUMENTS

484943  3/1992  Japan .

OTHER PUBLICATIONS

"Head of Line Arbitration in ATM Switches with Input–Output Buffering and Backpressure Control".BY Hosien F. Badran and H. T. Mouftah, *GLOBECOM '91*, PP. 0347–0351.

An Ascom Timplex White Paper, *Meeting Critical Requirements with Scalable Enterprise Networking Solutions Based on a Unified ATM Foundation*, pp. 1–12, Apr. 1994.

Douglas H. Hunt, *ATM Traffic Management—Another Perspective*, Business Communications Review, Jul. 1994.

Richard Bubenik et al., *Leaf Initiated Join Extensions*, Technical Committee, Signalling Subworking Group, ATM Forum/94–0325R1, Jul. 1, 1994.

(List continued on next page.)

*Primary Examiner*—Ricky Q. Ngo
*Attorney, Agent, or Firm*—Weingarten, Schurgin, Gagnebin & Hayes LLP

[57] ABSTRACT

An apparatus and a method are disclosed for arbitrating between streams of ATM cells, or sources for a connection, on multiple input port processors vying for an opportunity to be transmitted as a fixed bandwidth, or allocated, connection on a single output port through a network switch. The network switch maintains a plurality of input port processors, at least one output port, and input and output buffers associated with the respective input and output ports. Streams of ATM cells enter the network switch as sources for a connection through the multiple input port processors and are buffered in the input buffers. The ATM cells are then routed from the input buffers to an output buffer in the output port. The network switch also provides a multipoint topology controller (MTC) and a bandwidth arbiter (BA) for performing the arbitration.

13 Claims, 3 Drawing Sheets

U.S. PATENT DOCUMENTS

| | | |
|---|---|---|
| 4,893,307 | 1/1990 | McKay et al. . |
| 4,894,824 | 1/1990 | Hemmady et al. . |
| 4,897,841 | 1/1990 | Gang, Jr. . |
| 4,899,333 | 2/1990 | Roediger . |
| 4,920,531 | 4/1990 | Isono et al. . |
| 4,922,503 | 5/1990 | Leone . |
| 4,933,939 | 6/1990 | Sheehy . |
| 4,947,390 | 8/1990 | Sheehy . |
| 4,953,157 | 8/1990 | Franklin et al. . |
| 4,956,839 | 9/1990 | Torii et al. . |
| 4,958,341 | 9/1990 | Hemmady et al. . |
| 4,979,100 | 12/1990 | Makris et al. ............................ 364/200 |
| 4,993,018 | 2/1991 | Hajikano et al. . |
| 5,021,949 | 6/1991 | Morten et al. ............................ 364/200 |
| 5,029,164 | 7/1991 | Goldstein et al. . |
| 5,060,228 | 10/1991 | Tsutsui et al. . |
| 5,067,123 | 11/1991 | Hyodo et al. . |
| 5,070,498 | 12/1991 | Kakuma et al. . |
| 5,083,269 | 1/1992 | Syobatake et al. ...................... 395/650 |
| 5,084,867 | 1/1992 | Tachibana et al. . |
| 5,084,871 | 1/1992 | Carn et al. . |
| 5,090,011 | 2/1992 | Fukuta et al. . |
| 5,090,024 | 2/1992 | Vander Mey et al. . |
| 5,093,912 | 3/1992 | Dong et al. ............................... 395/650 |
| 5,115,429 | 5/1992 | Hluchyj et al. . |
| 5,119,369 | 6/1992 | Tanabe et al. . |
| 5,119,372 | 6/1992 | Verbeek . |
| 5,128,932 | 7/1992 | Li . |
| 5,130,975 | 7/1992 | Akata . |
| 5,130,982 | 7/1992 | Ash et al. . |
| 5,132,966 | 7/1992 | Hayano et al. . |
| 5,146,474 | 9/1992 | Nagler et al. . |
| 5,146,560 | 9/1992 | Goldberg et al. ........................ 385/200 |
| 5,150,358 | 9/1992 | Punj et al. . |
| 5,151,897 | 9/1992 | Suzuki . |
| 5,157,657 | 10/1992 | Potter et al. . |
| 5,163,045 | 11/1992 | Caram et al. . |
| 5,163,046 | 11/1992 | Hahne et al. . |
| 5,179,556 | 1/1993 | Turner . |
| 5,179,558 | 1/1993 | Thacker et al. . |
| 5,185,743 | 2/1993 | Murayama et al. . |
| 5,191,582 | 3/1993 | Upp . |
| 5,191,652 | 3/1993 | Dias et al. ............................... 395/200 |
| 5,193,151 | 3/1993 | Jain ......................................... 395/200 |
| 5,197,067 | 3/1993 | Fujimoto et al. . |
| 5,198,808 | 3/1993 | Kudo ..................................... 340/825.8 |
| 5,199,027 | 3/1993 | Barri . |
| 5,239,539 | 8/1993 | Uchida et al. . |
| 5,253,247 | 10/1993 | Hirose et al. . |
| 5,253,248 | 10/1993 | Dravida et al. . |
| 5,255,264 | 10/1993 | Cotton et al. . |
| 5,255,266 | 10/1993 | Watanabe et al. . |
| 5,257,311 | 10/1993 | Naito et al. ............................... 380/48 |
| 5,258,979 | 11/1993 | Oomuro et al. . |
| 5,265,088 | 11/1993 | Takigawa et al. . |
| 5,267,232 | 11/1993 | Katsube et al. . |
| 5,268,897 | 12/1993 | Komine et al. . |
| 5,271,010 | 12/1993 | Miyake et al. . |
| 5,272,697 | 12/1993 | Fraser et al. . |
| 5,274,641 | 12/1993 | Shobatake et al. . |
| 5,274,768 | 12/1993 | Traw et al. .............................. 395/275 |
| 5,280,469 | 1/1994 | Taniguchi et al. . |
| 5,280,470 | 1/1994 | Buhrke et al. . |
| 5,282,201 | 1/1994 | Frank et al. . |
| 5,283,788 | 2/1994 | Morita et al. . |
| 5,285,446 | 2/1994 | Yonehara . |
| 5,287,349 | 2/1994 | Hyodo et al. . |
| 5,287,535 | 2/1994 | Sakagawa et al. . |
| 5,289,462 | 2/1994 | Ahmadi et al. . |
| 5,289,463 | 2/1994 | Mobasser . |
| 5,289,470 | 2/1994 | Chang et al. . |
| 5,291,481 | 3/1994 | Doshi et al. . |
| 5,291,482 | 3/1994 | McHarg et al. . |
| 5,295,134 | 3/1994 | Yoshimura et al. . |
| 5,301,055 | 4/1994 | Bagchi et al. ........................... 395/139 |
| 5,301,184 | 4/1994 | Uriu et al. . |
| 5,301,190 | 4/1994 | Tsukuda et al. . |
| 5,301,193 | 4/1994 | Toyofuku et al. . |
| 5,303,232 | 4/1994 | Proctor et al. . |
| 5,305,311 | 4/1994 | Lyles . |
| 5,309,431 | 5/1994 | Tominage et al. . |
| 5,309,438 | 5/1994 | Nakajima . |
| 5,311,586 | 5/1994 | Bogart et al. ........................... 379/221 |
| 5,313,454 | 5/1994 | Bustini et al. . |
| 5,313,458 | 5/1994 | Suzuki . |
| 5,315,586 | 5/1994 | Charvillat . |
| 5,319,638 | 6/1994 | Lin . |
| 5,321,695 | 6/1994 | Faulk, Jr. . |
| 5,323,389 | 6/1994 | Bitz et al. . |
| 5,333,131 | 7/1994 | Tanabe et al. . |
| 5,333,134 | 7/1994 | Ishibashi et al. . |
| 5,335,222 | 8/1994 | Kamoi et al. . |
| 5,335,325 | 8/1994 | Frank et al. ............................. 395/200 |
| 5,339,310 | 8/1994 | Taniguchi . |
| 5,339,317 | 8/1994 | Tanaka et al. . |
| 5,339,318 | 8/1994 | Tanaka et al. . |
| 5,341,366 | 8/1994 | Soumiya et al. . |
| 5,341,373 | 8/1994 | Ishibashi et al. . |
| 5,341,376 | 8/1994 | Yamashita . |
| 5,345,229 | 9/1994 | Olnowich et al. .................... 340/825.8 |
| 5,350,906 | 9/1994 | Brody et al. ............................ 235/379 |
| 5,355,372 | 10/1994 | Sengupta et al. . |
| 5,357,506 | 10/1994 | Sugawara . |
| 5,357,507 | 10/1994 | Hughes et al. . |
| 5,357,508 | 10/1994 | Le Boudec et al. . |
| 5,357,510 | 10/1994 | Norizuki et al. . |
| 5,359,600 | 10/1994 | Ueda et al. . |
| 5,361,251 | 11/1994 | Aihara et al. . |
| 5,361,372 | 11/1994 | Rege et al. .............................. 395/800 |
| 5,363,433 | 11/1994 | Isono . |
| 5,365,514 | 11/1994 | Hershey . |
| 5,371,893 | 12/1994 | Price et al. .............................. 395/725 |
| 5,373,504 | 12/1994 | Tanaka et al. . |
| 5,375,117 | 12/1994 | Morita et al. . |
| 5,377,262 | 12/1994 | Bales et al. . |
| 5,377,327 | 12/1994 | Jain et al. ............................... 395/200 |
| 5,379,297 | 1/1995 | Glover et al. . |
| 5,379,418 | 1/1995 | Shimazaki et al. ..................... 395/575 |
| 5,390,170 | 2/1995 | Sawant et al. . |
| 5,390,174 | 2/1995 | Jugel . |
| 5,390,175 | 2/1995 | Hiller et al. . |
| 5,392,280 | 2/1995 | Zheng . |
| 5,392,402 | 2/1995 | Robrock, II ............................ 395/200 |
| 5,394,396 | 2/1995 | Yoshimura et al. . |
| 5,394,397 | 2/1995 | Yanagi et al. . |
| 5,398,235 | 3/1995 | Tsuzuki et al. . |
| 5,400,337 | 3/1995 | Hunter . |
| 5,402,415 | 3/1995 | Turner ..................................... 370/390 |
| 5,412,648 | 5/1995 | Fan . |
| 5,414,703 | 5/1995 | Sakaue et al. . |
| 5,420,858 | 5/1995 | Marshall et al. . |
| 5,420,988 | 5/1995 | Elliott ..................................... 395/275 |
| 5,422,879 | 6/1995 | Parsons et al. . |
| 5,425,021 | 6/1995 | Derby et al. . |
| 5,425,026 | 6/1995 | Mori . |
| 5,432,713 | 7/1995 | Takeo et al. ............................ 707/505 |
| 5,432,784 | 7/1995 | Ozveren . |
| 5,432,785 | 7/1995 | Ahmed et al. . |
| 5,432,908 | 7/1995 | Heddes et al. .......................... 395/250 |
| 5,436,886 | 7/1995 | McGill . |
| 5,436,893 | 7/1995 | Barnett ................................... 370/390 |
| 5,440,547 | 8/1995 | Easki et al. . |

| | | |
|---|---|---|
| 5,444,702 | 8/1995 | Burnett et al. . |
| 5,446,733 | 8/1995 | Tsuruoka ............................. 370/232 |
| 5,446,737 | 8/1995 | Cidon et al. . |
| 5,446,738 | 8/1995 | Kim et al. . |
| 5,448,559 | 9/1995 | Hayter et al. . |
| 5,450,406 | 9/1995 | Esaki . |
| 5,452,296 | 9/1995 | Shimizu ............................. 370/399 |
| 5,455,820 | 10/1995 | Yamada . |
| 5,455,825 | 10/1995 | Lauer et al. ........................ 370/390 |
| 5,457,687 | 10/1995 | Newman . |
| 5,459,743 | 10/1995 | Fukuda et al. .................... 714/819 |
| 5,461,611 | 10/1995 | Drake, Jr. et al. . |
| 5,463,620 | 10/1995 | Sriram . |
| 5,465,331 | 11/1995 | Yang et al. .................... 395/200.08 |
| 5,475,679 | 12/1995 | Munter . |
| 5,479,401 | 12/1995 | Bitz et al. ......................... 370/397 |
| 5,479,402 | 12/1995 | Hata et al. ........................ 370/397 |
| 5,483,526 | 1/1996 | Ben-Nun et al. . |
| 5,485,453 | 1/1996 | Wahlman et al. . |
| 5,485,455 | 1/1996 | Dobbins et al. . |
| 5,487,063 | 1/1996 | Kakuma et al. ................... 370/396 |
| 5,488,606 | 1/1996 | Kakuma et al. . |
| 5,491,691 | 2/1996 | Shtayer et al. . |
| 5,491,694 | 2/1996 | Oliver et al. . |
| 5,493,566 | 2/1996 | Ljungberg et al. . |
| 5,497,369 | 3/1996 | Wainwright ...................... 370/390 |
| 5,499,238 | 3/1996 | Shon . |
| 5,504,741 | 4/1996 | Yamanaka et al. . |
| 5,504,742 | 4/1996 | Kakuma et al. ................... 370/420 |
| 5,506,834 | 4/1996 | Sekihata et al. ................... 370/236 |
| 5,506,839 | 4/1996 | Hatta .................................. 370/236 |
| 5,506,956 | 4/1996 | Cohen . |
| 5,509,001 | 4/1996 | Tachibana et al. ................ 370/391 |
| 5,509,007 | 4/1996 | Takashima et al. ............... 370/391 |
| 5,513,134 | 4/1996 | Cooperman et al. ................ 365/49 |
| 5,513,178 | 4/1996 | Tanaka .............................. 370/398 |
| 5,513,180 | 4/1996 | Miyake et al. .................... 370/395 |
| 5,515,359 | 5/1996 | Zheng . |
| 5,517,495 | 5/1996 | Lund et al. . |
| 5,519,690 | 5/1996 | Suzuka et al. . |
| 5,521,905 | 5/1996 | Oda et al. . |
| 5,521,915 | 5/1996 | Dieudonne et al. . |
| 5,521,916 | 5/1996 | Choudhury et al. . |
| 5,521,917 | 5/1996 | Watanabe et al. ................. 370/399 |
| 5,521,923 | 5/1996 | Willmann et al. . |
| 5,523,999 | 6/1996 | Takano et al. ..................... 370/389 |
| 5,524,113 | 6/1996 | Gaddis . |
| 5,526,344 | 6/1996 | Diaz et al. . |
| 5,528,588 | 6/1996 | Bennett et al. . |
| 5,528,590 | 6/1996 | Iidaka et al. ....................... 370/395 |
| 5,528,591 | 6/1996 | Lauer . |
| 5,530,695 | 6/1996 | Dighe et al. . |
| 5,533,009 | 7/1996 | Chen . |
| 5,533,020 | 7/1996 | Byrn et al. . |
| 5,535,196 | 7/1996 | Aihara et al. ...................... 370/429 |
| 5,535,197 | 7/1996 | Cotton . |
| 5,537,396 | 7/1996 | Abe et al. .......................... 370/252 |
| 5,541,912 | 7/1996 | Choudhury et al. . |
| 5,544,168 | 8/1996 | Jeffrey et al. . |
| 5,544,169 | 8/1996 | Norizuki et al. ................... 370/395 |
| 5,544,170 | 8/1996 | Kasahara ............................ 370/253 |
| 5,546,389 | 8/1996 | Wippenbeck et al. . |
| 5,546,391 | 8/1996 | Hochschild et al. . |
| 5,546,392 | 8/1996 | Boal et al. . |
| 5,550,821 | 8/1996 | Akiyoshi ........................... 370/397 |
| 5,550,823 | 8/1996 | Irie et al. . |
| 5,553,057 | 9/1996 | Nakayama ......................... 370/241 |
| 5,553,068 | 9/1996 | Aso et al. . |
| 5,555,243 | 9/1996 | Kakuma et al. ................... 370/352 |
| 5,555,265 | 9/1996 | Kakuma et al. ................... 370/395 |
| 5,557,607 | 9/1996 | Holden . |
| 5,568,479 | 10/1996 | Watanabe et al. ................. 370/399 |
| 5,570,348 | 10/1996 | Holden .............................. 370/395 |
| 5,570,361 | 10/1996 | Norizuki et al. ................... 370/395 |
| 5,570,362 | 10/1996 | Nishimura ......................... 370/395 |
| 5,572,522 | 11/1996 | Calamvokis et al. ............. 370/390 |
| 5,577,032 | 11/1996 | Sone et al. ......................... 370/390 |
| 5,577,035 | 11/1996 | Hayter et al. ...................... 370/390 |
| 5,583,857 | 12/1996 | Soumiya et al. ................... 370/233 |
| 5,583,858 | 12/1996 | Hanaoka ............................ 370/392 |
| 5,583,861 | 12/1996 | Holden .............................. 370/395 |
| 5,590,132 | 12/1996 | Ishibashi et al. .................. 370/236 |
| 5,602,829 | 2/1997 | Nie et al. ........................... 370/235 |
| 5,610,913 | 3/1997 | Tomonaga et al. ................ 370/219 |
| 5,623,405 | 4/1997 | Isono ................................. 395/230 |
| 5,625,846 | 4/1997 | Kobayakawa et al. ........... 395/872 |
| 5,633,861 | 5/1997 | Hanson et al. . |

OTHER PUBLICATIONS

Douglas H. Hunt et al., *Flow Controlled Virtual Connections Proposal for ATM Traffic Management (Revision R2)*, Traffic Management Subworking Group, ATM_Forum/ 94–0632R2, Aug. 1994.

Flavio Bonomi et al., *The Rate–Based Flow Control Framework for the Available Bit Rate ATM Service*, IEEE Network, Mar./Apr. 1995, pp. 25–39.

R. Jain, *Myths About Congestion Management in High Speed Networks*, Internetworking Research and Experience, vol. 3, 101–113 (1992).

Douglas H. Hunt et al., *Credit–Based FCVC Proposal for ATM Traffic Management (Revision R1)*, ATM Forum Technical Committee Traffic Management Subworking Group, ATM_Forum/94–0168R1, Apr. 28, 1994.

Douglas H. Hunt et al., *Action Item Status for Credit–Based FCVC Proposal*, ATM Forum Technical Committee Traffic Management Subworking Group, ATM_Forum/94–0439, Apr. 28, 1994.

Timothy P. Donahue et al., *Arguments in Favor of Continuing Phase 1 as the Initial ATM Forum P–NNI Routing Protocol Implementation*, ATM Forum Technical Committee, ATM Forum/94–0460, Apr. 28, 1994.

Richard Bubenick et al., *Leaf Initiated Join Extensions*, Technical Committee, Signalling Subworking Group, ATM Forum/94–0325, Apr. 28, 1994.

Rob Coltun et al., *PRP: A P–NNI Routing Protocol Proposal*, ATM Forum Technical Committee, ATM_Forum/ 94–0492, Apr. 28, 1994.

Richard Bubenik et al., *Leaf Initated Join Extensions*, ATM Forum Technical Committee, Signalling Subworking Group, ATM Forum 94–0325, Apr. 28, 1994.

Richard Bubenik et al., *Requirements for Phase 2 Signaling Protocol*, ATM Forum Technical Committee, Signaling Subworking Group, ATM Forum 94–1078, Jan. 1, 1994.

SITA, ATM RFP: C–Overall Technical Requirements, Sep. 1994.

H.T. Kung and K. Chang, *Receiver–Oriented Adaptive Buffer Allocation in Credit–Based Flow Control for ATM Networks*, Proceedings of INFOCOM '95, Apr. 2–6, 1995, pp. 1–14.

H.T. Kung, et al., *Credit–Based Flow Control for ATM Networks: Credit Update Protocol, Adaptive Credit Allocation, and Statistical Multiplexing*, Proceedings fo ACM SIGCOMM '94 Symposium on Communications Architectures, Protocols and Applications, Aug. 31–Sep. 2, 1994, pp. 1–14.

MULTIPOINT-TO-POINT ARBITRATION IN A NETWORK SWITCH

CROSS-REFERENCE TO RELATED APPLICATIONS

This application is a continuation of application Ser. No. 08/683,132 filed Jul. 18, 1996 now abandoned.

A claim of priority is made to provisional application Ser. No. 60/001,498, entitled COMMUNICATION METHOD AND APPARATUS, filed Jul. 19, 1995.

FIELD OF THE INVENTION

The present invention is generally related to network switching and, more particularly, to an apparatus and a method for arbitrating between streams of data cells, or sources for a connection, on multiple input port processors vying for an opportunity to be transmitted as a fixed bandwidth, or allocated, connection on a single output port through a network switch.

BACKGROUND OF THE INVENTION

Telecommunications networks such as asynchronous transfer mode (ATM) networks are used for the transfer of audio, video, and other data. ATM networks deliver data by routing data units such as ATM cells from a source to a destination through switches. Switches typically include multiple input/output (I/O) ports through which ATM cells are received and transmitted. The appropriate output port to which a received ATM cell is to be routed to and thereafter transmitted from is determined based upon an ATM cell header.

Oftentimes, the cell headers of ATM cells received on several different input port processors specify a single particular output port. The occurrence of such an event does not usually pose a problem unless the bandwidth capability of the connection through the output port is less than the sum of the bandwidth rates of the connections on the input port processors for an extended period of time. Such a problem is resolved by either discarding ATM cells which cannot be included within the allocated output bandwidth or asserting flow control back at the connection source.

A further problem exists, however, in that the discarding of ATM cells has heretofore not been evenly distributed among the several different input port processors. That is, ATM cells have been disproportionately discarded among the connections from the several different input port processors. Such can result in a corresponding disproportionate diminishment of data quality causing, for example, undesirable interruptions in audio and video data transmissions or other more serious damage to other types of data transmissions. Accordingly, it would be desirable to devise a scheme whereby the allocated output bandwidth of a connection at an output port is evenly distributed among sources for a connection from the several different input port processors in a multipoint-to-point switching scenario.

SUMMARY OF THE INVENTION

An apparatus and a method are disclosed for arbitrating between streams of data cells, or sources for a connection, on multiple input port processors vying for an opportunity to be transmitted as a fixed bandwidth, or allocated, connection on a single output port through a network switch. The network switch comprises a plurality of input port processors, at least one output port, and input and output buffers associated with the respective input and output ports. Streams of data cells enter the switch as sources for a connection through multiple input port processors and are buffered in the input buffers. The data cells are then routed from the input buffers to the output buffer in the output port.

The network switch also comprises a multipoint topology controller (MTC) and a bandwidth arbiter (BA) for performing the arbitration. The MTC looks up a Fan-In-Number (FIN) identifier for every cell time slot in a switch allocation table (SAT) for which a scheduling list has an entry, assuming that the input buffers, which are arranged into queues, that are listed on the scheduling list have data cells to send and the scheduling list has not exceeded its bandwidth allocation. The BA compares all the valid FIN identifiers and, if there is a match, performs multipoint-to-point arbitration among the input port processors that have scheduling lists which reference that FIN. The BA reads the FIN state information and gives the bandwidth to the input port processor having the highest priority. The BA then updates the FIN state information with data that indicates which input port processor will have the highest priority on the next arbitration for this multipoint-to-point connection.

From the above descriptive summary it is apparent how the present invention apparatus and method overcome the shortcomings of the above-mentioned prior art.

Accordingly, the primary object of the present invention is to provide an apparatus and a method for arbitrating between sources for a connection on multiple input port processors vying for an opportunity to be transmitted as a fixed bandwidth, or allocated, connection on a single output port through a network switch.

The above-stated primary object, as well as other objects, features, and disadvantages, of the present invention will become readily apparent from the following detailed description which is to be read in conjunction with the appended drawings.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF THE PRESENT INVENTION

Figure 1:
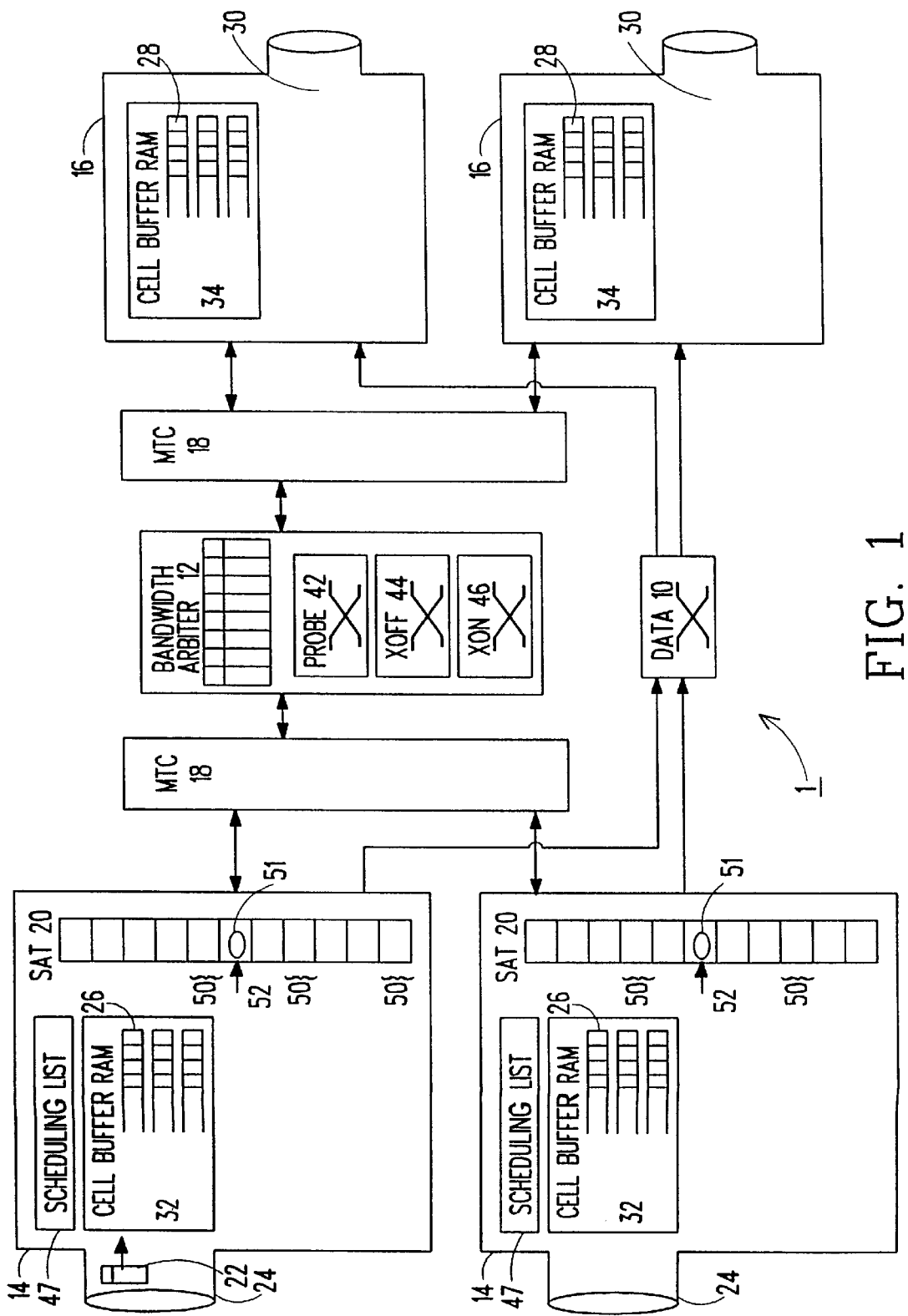
FIG. 1 is a block diagram of a network switch according to the present invention.

Referring to FIG. 1, there is shown a network switch 1 comprising a Data Crossbar 10, a Bandwidth Arbiter (BA) 12, a plurality of input port processors 14, a plurality of output ports 16, and a plurality of Multipoint Topology Controllers (MTC) 18. The Data Crossbar 10, which may be an N×N crosspoint switch, is used for data cell transport and, in this particular embodiment, yields N×670 Mbps throughput. The BA 12 controls switch interconnections, dynamically schedules momentarily unused bandwidth, and resolves multipoint-to-point bandwidth contention. Each input port processor 14 schedules the transmission of data cells to the Data Crossbar 10 from multiple connections. Each output port 16 receives data cells from the Data Crossbar 10 and organizes those data cells onto output links.

In order to traverse the switch 1, a data cell 22 first enters the switch 1 on a link 24 to an input port processor 14 and is buffered in a queue 26 of input buffers. The data cell 22 is then transmitted from the queue 26 of input buffers through the Data Crossbar 10 to a queue 28 of output buffers in an output port 16. From the queue 28 of output buffers, the data cell 22 is transmitted onto a link 30 outside of the switch 1, for example, to another switch. To facilitate traversal of the switch 1, each input port processor 14 includes a cell buffer RAM 32 and each output port 16 includes a cell buffer RAM 34. The cell buffer RAM's 32 and 34 are organized into the respective input and output queues 26 and 28. All data cells 22 in a connection pass must through a unique input queue 26 and a unique output queue 28 for the life of the connection. The queues 26 and 28 thus preserve cell ordering. This strategy also allows quality of service ("QoS") guarantees on a per connection basis.

Three communication paths are used to facilitate traversal of the switch 1 via probe and feedback messages: a Probe Crossbar 42, an XOFF Crossbar 44, and an XON Crossbar 46. The Probe Crossbar 42, which in this particular embodiment is an N×N crosspoint switch, is used to transmit a multiqueue number from an MTC 18 to an output port 16. Each input port processor 14 includes a plurality of scheduling lists 47, each of which is a circular list containing input queue numbers for a particular connection. Each multiqueue number is derived from information provided to the MTC 18 from a scheduling list 47 in an input port processor 14. A multiqueue number identifies one or more output queues 28 to which a data cell may be transmitted when making a connection. An output port 16 uses the multiqueue number to direct a request message probe to the appropriate output queue or queues 28 and thereby determine if there are enough output buffers available in the output queue or queues 28 for the data cell.

The XOFF Crossbar 44, which in this particular embodiment is an N×N crosspoint switch, is used to communicate "DO NOT SEND" type feedback messages from an output port 16 to an input port processor 14. An XOFF feedback message is a two bit message, wherein the first bit of the message is an ACCEPT/REJECT bit and the second bit of the message is an XOFF/NO-OP bit. When the first bit of the XOFF feedback message, namely the ACCEPT/REJECT bit, is set to "0", the output port 16 has "accepted" a request message probe from an input port processor 14 to transfer a data cell to a particular output queue 28. Thus, a data cell may then be transferred from an input queue 26 through the Data Crossbar 10 to that output queue 28.

Conversely, when the first bit of the XOFF feedback message is set to "1", the output port 16 has "rejected" a request message probe from an input port processor 14 to transfer a data cell to a particular output queue 28. In this case, a data cell may not be transferred from an input queue 26 through the Data Crossbar 10 to that output queue 28, usually because insufficient buffer space is available to receive a data cell. However, further request message probes may still be able to be sent from the input port processor 14 depending upon the state of the XOFF/NO-OP bit in the XOFF message as described below.

When the second bit of the XOFF feedback message, namely the XOFF/NO-OP bit, is set to "1", the scheduling list 47 in the input port processor 14 that provided information to the MTC 18 in order to derive the multiqueue number for the request message probe is placed in an XOFF state. This means that the scheduling list 47 may no longer be used to initiate the sending of request message probes. The scheduling list 47 remains in an XOFF state until receiving an XON message from the output port 16, as described below. An input port processor 14 responds to an asserted XOFF feedback message by modifying XOFF state bits in a descriptor of the scheduling list 47. The XOFF state bits prevent the input port processor 14 from attempting to send a request message probe from the input port processor 14 to the output port 16 until notified by the output port 16 that output buffers are available for a corresponding connection.

When the second bit of the XOFF feedback message, namely the XOFF/NO-OP bit, is set to "0", a no operation message is indicated, meaning that no adverse action has been taken with respect to the scheduling list 47 in the input port processor 14 that provided information to the MTC 18 in order to derive the multiqueue number for the request message probe. In other words, the scheduling list 47 may still be used to provide request message probes.

The XON Crossbar 46, which in this particular embodiment is an N×N crosspoint switch, is used to communicate "ENABLE SEND" type messages from an output port 16 to an input port processor 16. More particularly, the XON Crossbar 46 communicates an XON feedback message from an output port 16 to an input port processor 14. When an XOFF feedback message has been asserted by an output port 16 in response to a request probe message from an input port processor 14, the output port 16 sets a state bit in a queue descriptor of a corresponding output queue 28. When the number of data cells in that output queue 28 drops below an XON threshold, an XON message is sent from that output port 16 to the input port processor 14. The XON message enables the scheduling list 47 in the input port processor 14 to be used in the sending of request probe messages, and hence data cells.

The Probe & XOFF communication paths operate in a pipelined fashion. First, an input port processor 14 selects a scheduling list 47, and information associated with that scheduling list 47 is used to determine the output port 16, or the output queue 28, to which a data cell will be transmitted. More particularly, a multiqueue number, which is derived from information provided to an MTC 18 from a scheduling list 47 in an input port processor 14, is transmitted from the MTC 18 to one or more output ports 16 using the Probe Crossbar 42. Each output port 16 then tests for buffer availability and asserts a "DO NOT SEND" type feedback message through the XOFF Crossbar 44 if output buffering is not available for that connection. If output buffering is available for that connection, the input port processor 14 transmits a data cell to one or more output queues 28 through the Data Crossbar 10.

Figure 2:
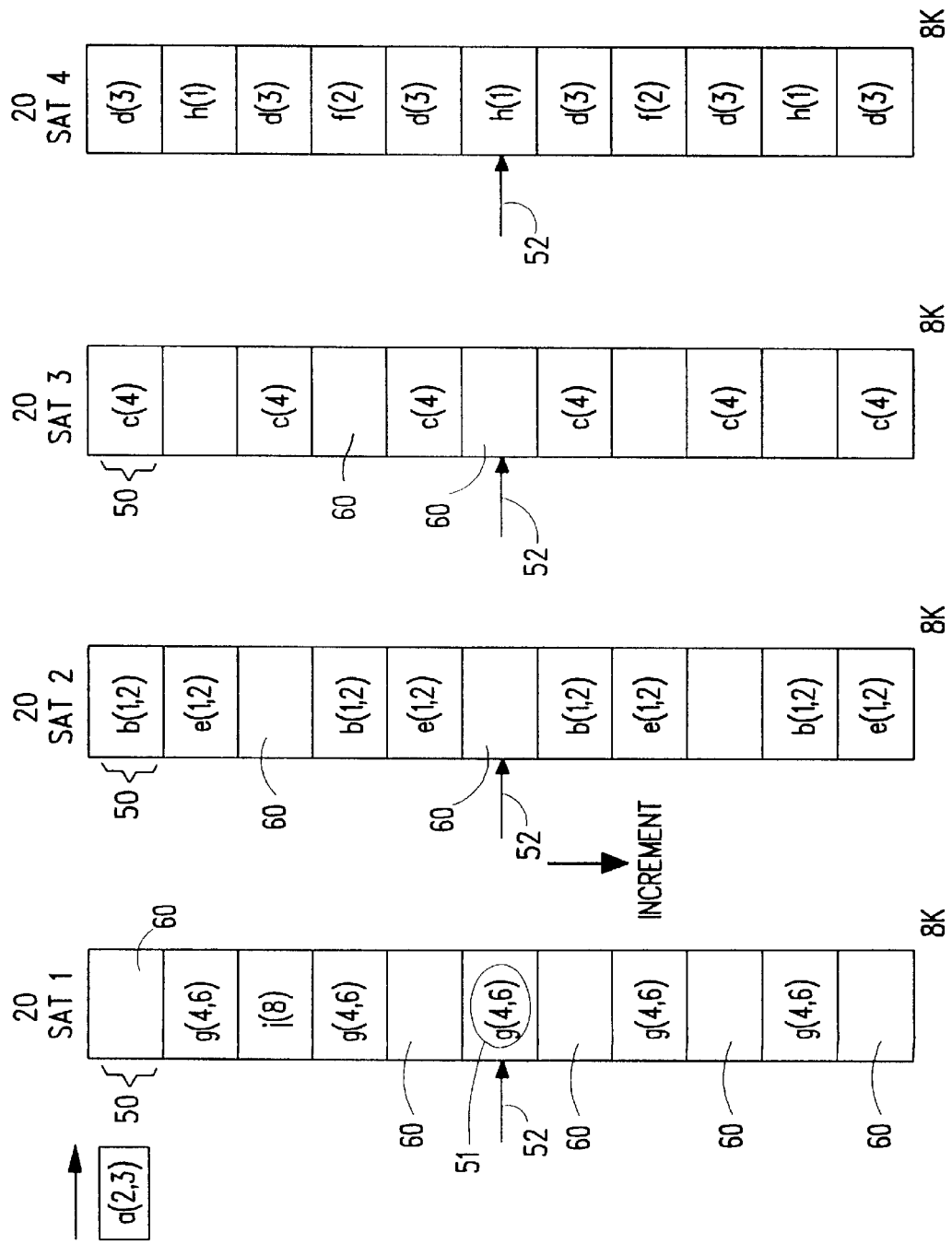
FIG. 2 is illustrates the operation of several switch allocation tables in the network switch according to the present invention.

Referring now to FIGS. 1 and 2, each input port processor 14 within the switch 1 includes a Switch Allocation Table (SAT) 20 for mapping bandwidth allocation. SAT's 20 are the basic mechanism behind the scheduling of data cells. Each SAT 20 includes a plurality of sequentially ordered cell time slots 50 and a pointer 52 which is always directed to one of the cell time slots 50. All of the pointers 52 in the switch 1 are synchronized such that at any given point in time each of the pointers 52 is directed to the same cell time slot 50 in the respective SAT 20 with which the pointer 52 is associated, e.g., the first cell time slot. In operation, the pointers 52 are advanced in lock-step, with each cell time slot 50 being active for 32 clock cycles at 50 MHz. When a pointer 52 is directed toward a cell time slot 50, an input port processor 14 uses the corresponding entry 51 in the cell time slot 50 to obtain a data cell for launching into the Data Crossbar 10.

A counter in each input port processor 14 is incremented once for each cell time, and each pointer 52 returns to the first cell time slot 50 after reaching the last cell time slot 50. Hence, given an SAT 20 with a depth of 8 k, which defines a frame, each pointer 52 scans its respective SAT 20 approximately every 6 msec, thereby providing a maximum delay for a transmission opportunity of approximately 6 msec. The delay can be decreased by duplicating a given entry 51 at a plurality of cell time slots 50 within a SAT 20. The maximum delay that an incoming data cell will experience corresponds to the number of cell time slots 50 between the pointer 52 and the cell time slot 50 containing the entry 51 which specifies the location of the data cell. When multiple entries 51 are made in order to decrease the maximum possible number of separating cell time slots 50, the duplicate entries 51 are preferably spaced equidistantly within the SAT 20. Maximum delay for a transmission opportunity therefore corresponds to the frequency and spacing of duplicate entries 51 within the SAT 20.

The amount of bandwidth allocated to a particular connection corresponds to the frequency at which a given entry 51 appears in a SAT 20. Each cell time slot 50 provides 64 kbps of bandwidth. Since a pointer 52 cycles through a SAT 20 at a constant rate, the total bandwidth allocated to a particular connection is equal to the product of 64 kbps times the number of occurrences of that entry 51. For example, connection identifier "g (4,6)," which occurs in five cell time slots 50, is allocated 320 kbps of bandwidth.

Significantly, unused cell time slots 60 correspond to unused bandwidth, which becomes available during the operation of the switch 1. Such unused bandwidth may occur because that bandwidth, i.e., that cell time slot 50 in the SAT 20, has not been allocated to any connection. Such bandwidth is referred to as "unallocated bandwidth." Unused bandwidth may also occur when a SAT entry 51 is allocated to a connection, but the connection does not have a data cell enqueued for transmission across the Data Crossbar 10. Such bandwidth is referred to as "allocated-unused" bandwidth. Both types of unused bandwidth are collectively referred to as "dynamic" bandwidth, and some connections, such as connections assigned an Available Bit Rate ("ABR") QoS level utilize such dynamic bandwidth. The BA 12 operates to increase efficiency within the switch 1 by granting dynamic bandwidth to such connections.

If valid, the contents of each SAT entry 51 point to a scheduling list 47. The contents of each (non-empty) entry in a scheduling list 47 consists of an input queue number. Each input queue number points to a input queue descriptor which contains state information that is specific to a particular connection. Each input queue descriptor, in turn, points to the head and the tail of a corresponding input queue 26, which contains data cells for transmission through the switch Data Crossbar 10.

If a SAT entry 51 does not contain a pointer to a scheduling list, i.e. the SAT entry 51 is set to zero, then the corresponding cell time slot 50 in the SAT 20 has not been allocated and that cell time slot 50 is available for dynamic bandwidth. Also, if a SAT entry 51 does contain a pointer to a scheduling list 47 but no queue number is listed in scheduling list 47, then there are no data cells presently available for transmission and the corresponding cell time slot 50 is also available for dynamic bandwidth.

Figure 3:
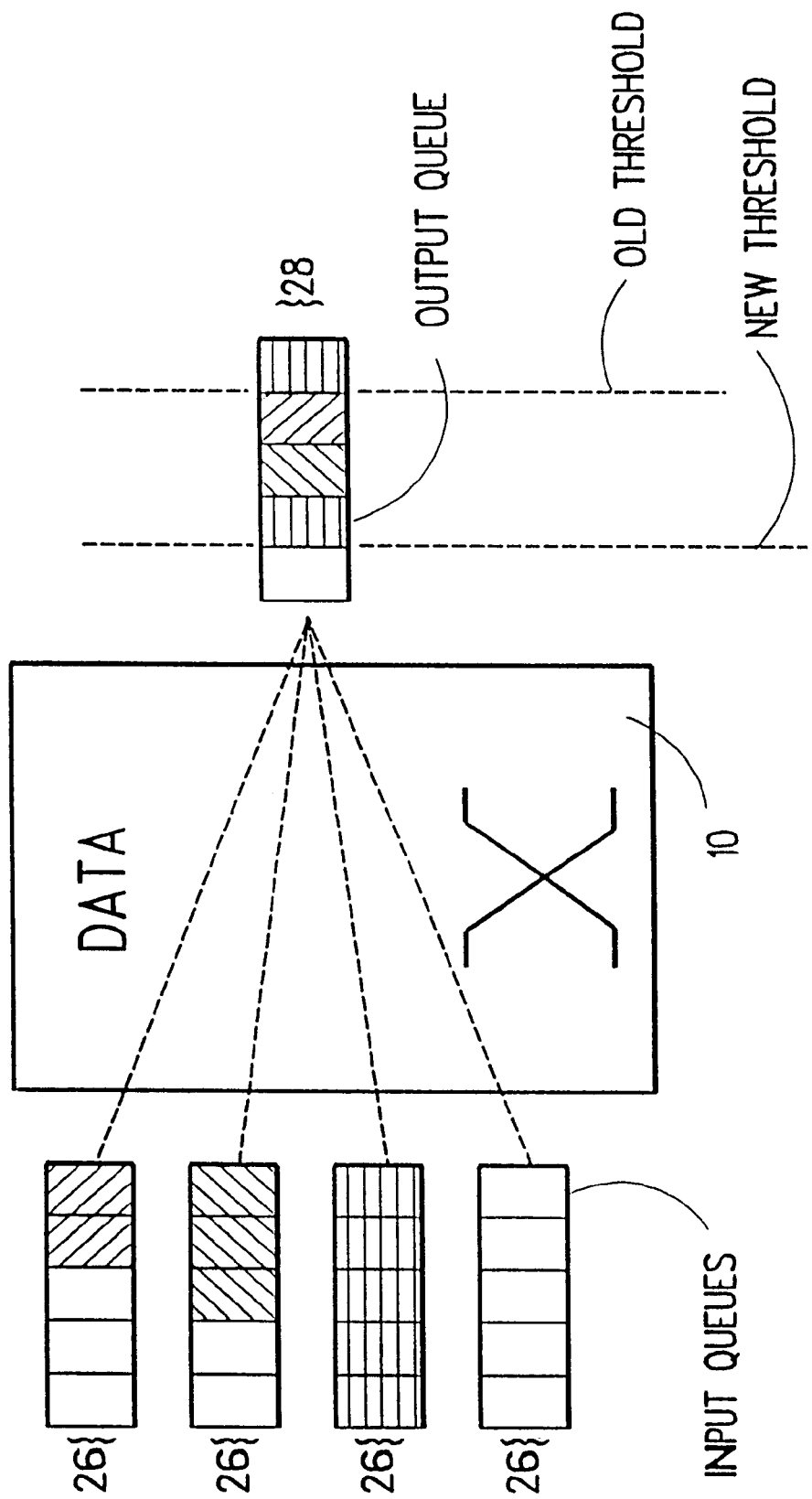
FIG. 3 is a block diagram illustrating a multipoint-to-point switching scenario.

FIG. 3 illustrates a multipoint-to-point switching scenario, i.e., transmission from multiple input queues 26 to a single output queue 28. As previously described, each output queue 28 has a threshold, and an XON message is sent from an output port 16 to an input port processor 14 when an output queue 28 drains below that threshold. In multipoint-to-point operation, the XON threshold of an output queue 28 is dynamically set to reserve enough output buffering for multiple input queues 26 to transmit to the output queue 28. For example, if four input queues 26 are transmitting data cells, the threshold is set to four so that the output queue 28 will have sufficient output buffering to receive all four of the data cells contemporaneously in serial fashion.

Referring now to FIGS. 1 and 3, in the case of multipoint-to-point connections, the XON Crossbar 46 is used to broadcast to every input port processor 14 in the switch 1, regardless of whether or not any particular input port processor 14 is transmitting to the output queue 28 asserting the broadcast. For the broadcast, the MTC 18 transmits a reverse broadcast channel number on behalf of the output port 16. The receiving MTC 18 then performs a reverse broadcast channel to scheduling list number look-up to determine which scheduling list 47 to enable. Any input port processor 14 without an input queue 26 transmitting to that particular output queue 28 is unaffected by the broadcast XON message since the reverse broadcast channel number look-up entry will be marked invalid.

A Fan-In-Number, or FIN, is a mechanism to associate scheduling lists 47 from different input port processors 14 in a multipoint-to-point connection, and have them compete against each other for bandwidth using an arbitration mechanism. This arbitration mechanism allows switch control software to load SAT entries 51 on multiple input port processors 14 with scheduling lists 47 that are transmitting to the same output port processor 16. Without this arbitration mechanism, such would be flagged as a programming error, i.e. it is not legal for multiple input port processors 14 to send data cells to a single output port processor 16. A FIN is required for every multipoint-to-point connection. The BA 12 uses the FIN to look-up state information for each multipoint-to-point connection. Basically, the FIN state information indicates which input port processor 14 was awarded bandwidth for the last arbitration for a particular multipoint-to-point connection. Based on this state information, the BA 12 either grants bandwidth to an input port processor 14, and hence a scheduling list 47, requesting bandwidth or denies the bandwidth because the bandwidth limit for a connection has been exceeded. The FIN state information also includes which scheduling list 47 received the bandwidth from the last arbitration. The BA 12 then picks the scheduling list 47 with the next highest priority as the winner of the multipoint-to-point arbitration. This is effectively round-robin sharing of the multipoint-to-point bandwidth.

If all of the input queues 26 for a connection competing in a multipoint-to-point arbitration are on a single input port processor 14, FIN's do not have to be used. In such a case, the input port processor 14 will perform the multipoint-to-point arbitration by sharing the bandwidth among the input queues 26 listed in a scheduling list 47. This case occurs when there are sources to a connection on multiple input links 24 feeding into an input port processor 14.

To ensure that all scheduling lists 47 competing in a multipoint-to-point arbitration all get a turn, the BA 12 grants the bandwidth to the scheduling lists 47 in a round-robin fashion. To perform this, the BA 12 keeps track of the last input port processor 14 associated with the scheduling list 47 that received bandwidth for each FIN identifier. The next time scheduling lists 47 compete for bandwidth having that FIN identifier, the BA 12 gives the bandwidth to the input port processor 14 having the next highest priority.

A FIN identifier is associated with each scheduling list 47 and is stored in the MTC 18. If a scheduling list 47 is not part of a multipoint-to-point connection, its FIN is set to invalid. To perform the arbitration the following sequence is followed:

1. The MTC 18 looks up a FIN identifier for every cell time slot 50 in a SAT 20 for which a scheduling list 47 has an entry, assuming that the input queues 26 listed on that scheduling list 47 have data cells to send and the scheduling list 47 has not exceeded its bandwidth allocation.
2. The BA 12 compares all of the valid FIN identifiers and, if there is a match, performs multipoint-to-point arbitration among the input port processors 14 that have scheduling lists 47 which reference that FIN.
3. The BA 12 reads the FIN state information, and gives the bandwidth to the scheduling list 47 having the next highest priority.
4. The BA 12 updates the FIN state information with data that indicates which input port processor 14 will have the highest priority on the next arbitration for this multipoint-to-point connection.

Of course, the above-described arbitration may be simultaneously conducted for numerous multipoint-to-point allocated connections competing for different output ports in the network switch 1.

Multipoint-to-point arbitration and flow control are coupled in the network switch 1 to provide fairness guarantees on the allocated portion of a multipoint-to-point connection. Typically, when a group of scheduling lists 47 are disabled due to flow control and then enabled at the same time a starvation condition may occur if one or a set of scheduling lists 47 consistently get chosen so that data cells from input queues 26 pointed to by those scheduling lists 47 get to be transmitted before data cells from input queues 26 pointed to by any other particular scheduling list 47 in the group get to be transmitted. To implement fairness, each input port processor 14 communicates XOFF state information to the BA 12 in conjunction with the FIN state information. The BA 12 uses this XOFF state information during multipoint-to-point arbitration to prevent starvation for the allocated portion of the connection by implementing round-robin allotment.

Table 1 shows how the XOFF history information is utilized by the BA 12.

TABLE 1

| SAT XOFF bit | History bit | Comment |
|---|---|---|
| 0 | 0 | No special action |
| 0 | 1 | The scheduling list will be granted the bandwidth. If several scheduling lists with the same FIN have their history bit set, one arbitrary one is picked. Eventually all scheduling lists which have a set history bit will be granted the bandwidth. If a scheduling list had its history bit set, the FIN state information will not be updated. |
| 1 | x | If one of the scheduling lists are XOFFed, none of the scheduling lists with the same FIN are granted the bandwidth. |

The SAT XOFF bit indicates the XOFF state of a scheduling list 47, wherein 0=NO-OP and 1=XOFF. The history bit indicates the ACCEPT/REJECT status of the scheduling list 47, i.e., whether the previous request message probe resulted in an ACCEPT or REJECT feedback message, wherein 0=ACCEPT, 1=REJECT. If the scheduling list 47 is in the XOFF state, no priority is given. Further, if the scheduling list 47 is in the XON state and the previous request message probe resulted in an ACCEPT feedback message, no priority is given. However, if the scheduling list 47 is in the XON state and the previous request message probe resulted in a REJECT feedback message, priority is given to the scheduling list 47. If multiple scheduling lists 47 have priority, the bandwidth is randomly allocated to the scheduling list having the highest priority. It will thus be appreciated that previously rejected scheduling lists 47 are given priority over other scheduling lists 47 based on the history bit, and fairness is thereby guaranteed.

It will be understood that various changes and modifications to the above described method and apparatus may be made without departing from the inventive concepts disclosed herein. Accordingly, the present invention is not to be viewed as limited to the embodiments described herein.

What is claimed is:

1. A method for arbitrating between connections on multiple input ports vying for an opportunity to be transmitted as an allocated connection to a single output port through a network switch, said method comprising the steps of:

looking up an identifier for a slot in a plurality of switch allocation tables, wherein each slot has at least one of a plurality of scheduling lists as an entry, wherein each scheduling list is associated with a connection on an input port, and wherein each connection is seeking an opportunity to be transmitted as an allocated connection to an output port;

comparing every identifier; and if there is a match between identifiers, performing an arbitration among the scheduling lists corresponding to the matching identifiers, wherein the scheduling list having a highest priority is awarded the opportunity to be transmitted as an allocated connection to the output port, and wherein the highest priority is based upon which scheduling list was the least most recent scheduling list to be awarded the opportunity to be transmitted as an allocated connection to the output port.

2. The method as defined in claim 1, further comprising updating a priority list to reflect which scheduling list was awarded the opportunity to be transmitted as an allocated connection to the output port.

3. An apparatus for arbitrating between connections on multiple input ports vying for an opportunity to be transmitted as an allocated connection to a single output port through a network switch, said apparatus comprising:

a controller for looking up an identifier for a slot in a plurality of switch allocation tables, wherein each slot has at least one of a plurality of scheduling lists as an entry, wherein each scheduling list is associated with a connection on an input port, and wherein each connection is seeking an opportunity to be transmitted as an allocated connection to an output port;

an arbiter for comparing every identifier and, if there is a match between identifiers, performing an arbitration among the scheduling lists corresponding to the matching identifiers, wherein the scheduling list having a highest priority is awarded the opportunity to be transmitted as an allocated connection to the output port, and wherein the highest priority is based upon which scheduling list was a least most recent scheduling list to be awarded the opportunity to be transmitted as an allocated connection to the output port.

4. The apparatus as defined in claim 3, wherein the arbiter keeps track of which scheduling list was awarded the opportunity to be transmitted as an allocated connection to the output port.

5. The apparatus as defined in claim 4, wherein the arbiter updates a priority list to reflect which scheduling list was awarded the opportunity to be transmitted as an allocated connection to the output port.

6. The apparatus as defined in claim 3, wherein each switch allocation table includes a plurality of slots.

7. The apparatus as defined in claim 6, wherein the plurality of slots are sequentially ordered.

8. The apparatus as defined in claim 3, wherein each scheduling list is a circular list containing input queue numbers for a connection on an input port.

9. The apparatus as defined in claim 8, wherein each input queue number points to an input queue descriptor which contains state information that is specific to a connection on an input port.

10. The apparatus as defined in claim 9, wherein each input queue descriptor points to the head and the tail of an input queue containing data cells for transmission through the network switch.

11. The apparatus as defined in claim 3, wherein an identifier is associated with each scheduling list.

12. The apparatus as defined in claim 11, wherein each identifier is stored by the controller.

13. A method for arbitrating between connections on multiple input ports vying for an opportunity to be transmitted as an allocated connection to a single output port through a network switch, said method comprising the steps of:

looking up an identifier for a slot in one of a plurality of switch allocation tables, wherein each slot has at least one of a plurality of scheduling lists as an entry, wherein each scheduling list is associated with a connection on an input port, and wherein each connection is seeking an opportunity to be transmitted as an allocated connection to an output port;

comparing the identifier to other identifiers for slots in other ones of the plurality of switch allocation tables; and if there is a match between identifiers, performing an arbitration among the scheduling lists corresponding to the matching identifiers, wherein the scheduling list having a highest priority is awarded the opportunity to be transmitted as an allocated connection to the output port, and wherein the highest priority is based upon which scheduling list was the least most recent scheduling list to be awarded a opportunity to be transmitted as an allocated connection to the output port.

\* \* \* \* \*